(12) United States Patent
Zhou et al.

(10) Patent No.: US 12,524,773 B2
(45) Date of Patent: Jan. 13, 2026

(54) METHOD FOR PREDICTING COAL QUALITY OF COAL MILL BASED ON NEURAL NETWORK

(71) Applicant: HUANENG SHANGHAI SHIDONGKOU SECOND POWER PLANT, Shanghai (CN)

(72) Inventors: Liren Zhou, Shanghai (CN); Siqin Chen, Shanghai (CN); Muou Chen, Shanghai (CN); Tianyi Sun, Shanghai (CN); Xiumin Zhong, Shanghai (CN); Xuehai Wang, Shanghai (CN); Jiawei Chen, Shanghai (CN); Huixian Chen, Shanghai (CN); Jianhui Guo, Shanghai (CN); Chunyan Huang, Shanghai (CN); Shansen Wu, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 966 days.

(21) Appl. No.: 17/702,803

(22) Filed: Mar. 24, 2022

(65) Prior Publication Data

US 2023/0016291 A1    Jan. 19, 2023

(30) Foreign Application Priority Data

Jul. 19, 2021   (CN) .......................... 202110815569.3

(51) Int. Cl.
*G06N 20/00*       (2019.01)
*G06F 30/27*       (2020.01)
(Continued)

(52) U.S. Cl.
CPC ........ *G06Q 30/0202* (2013.01); *G06F 30/27* (2020.01); *G06N 3/048* (2023.01)

(58) Field of Classification Search
CPC .... G06Q 30/0202; G06F 30/27; G06N 3/048; G06N 3/04; G06N 3/08; G01N 31/12
See application file for complete search history.

(56) References Cited

U.S. PATENT DOCUMENTS

| 2022/0236728 A1* | 7/2022 | Deodhar | ............ G05B 23/0221 |
| 2024/0054364 A1* | 2/2024 | Zheng | ...................... G06N 5/01 |
| 2024/0136026 A1* | 4/2024 | Takemoto | .............. G16C 20/30 |

OTHER PUBLICATIONS

Tuttle, Jacob F., Landen D. Blackburn, and Kody M. Powell. "On-line classification of coal combustion quality using nonlinear SVM for improved neural network NOx emission rate prediction." Computers & chemical engineering 141 (2020): 106990 (Year: 2020).*

(Continued)

*Primary Examiner* — Andrew T Mcintosh
(74) *Attorney, Agent, or Firm* — IDEA Intellectual Limited; Sam T. Yip

(57) ABSTRACT

A computer-implemented method for predicting coal quality of coal mill based on neural network is provided. The method includes: establishing a prediction model based on a neural network structure; importing cleaned coal mill data for model training; connecting the trained prediction model with a distributed control system (DCS) in real time; calculate online the running coal type of the coal mill; and determining the real-time running coal quality of the coal mill according to the calculation results.

3 Claims, 26 Drawing Sheets

(51) Int. Cl.
*G06N 3/048* (2023.01)
*G06Q 30/0202* (2023.01)

(56) References Cited

OTHER PUBLICATIONS

Tuttle, Jacob F., et al. "Sustainable NOx emission reduction at a coal fired power station through the use of online neural network modeling and particle swarm optimization." Control Engineering Practice 93 (2019): 104167 (Year: 2019).*
Zhang, Zelin, et al. "Multi-information online detection of coal quality based on machine vision." Powder Technology 374 (2020): 250-262 (Year: 2020).*

* cited by examiner

The schematic diagram of a node of the hidden layer

Case Processing Summary

| Samples | | Case number | Percentage |
|---|---|---|---|
| Effective | Training | 1553853 | 70% |
| | Verifying | 666064 | 30% |
| | | 2219917 | 100% |
| Exclude | | 0 | |
| Total | | 2219917 | |

FIG. 7

Model Summary

| | | |
|---|---|---|
| Training | Squared error | 1242.930 |
| | Relative error | .036 |
| | Interrupt condition | Exceeding the maximum training time: 240 min. |
| | Training time | 6:32:43.46 |
| Verifying | Squared error | 534.261 |
| | Relative error | .036 |

Dependent variable: Ash content

FIG. 8

Model Summary

| | Squared error | Relative error | Interrupt condition | Training time | Squared error | Relative error |
|---|---|---|---|---|---|---|
| Training | 385.092 | .008 | Exceeding the maximum training time: 480 min. | 8:00:28.30 | | |
| Verifying | | | | | 165.448 | .008 |

Dependent variable: Volatile content

FIG. 9

Model Summary

| | | |
|---|---|---|
| Training | Squared error | 798.493 |
| | Relative error | .024 |
| | Interrupt condition | Exceeding the maximum training time: 200 min. |
| | Training time | 1:47:01.41 |
| Verifying | Squared error | 343.929 |
| | Relative error | .024 |

Dependent variable: Calorific value

FIG. 10

Model Summary

| | | |
|---|---|---|
| Training | Squared error | 488.667 |
| | Relative error | .012 |
| | Interrupt condition | Exceeding the maximum training time: 240 min. |
| | Training time | 18:17:34.09 |
| Verifying | Squared error | 213.251 |
| | Relative error | .013 |

Dependent variable: Moisture

FIG. 11

| Model Name | | MOD_9 |
|---|---|---|
| Series / Sequence | 1 | Calorific value prediction |
| | 2 | Moisture prediction |
| | 3 | Volatile content prediction |
| | 4 | Ash content prediction |
| | 5 | Sulfur content prediction |
| Transform | | None |
| Non-seasonal difference | | 0 |
| Seasonal difference | | 0 |
| Seasonal period length | | N/A |
| Standardization | | Non-applied |
| Distribution | Type | Normal |
| | Position | Estimated |
| | Scaling | Estimated |
| Fractional rank estimation method | | Bloom's |
| The rank assigned to the bound value | | Average rank of the bound value |

FIG. 12

Case processing summary

| | Calorific value prediction | Moisture prediction | Volatile content prediction | Ash content prediction | Sulfur content prediction |
|---|---|---|---|---|---|
| Series of sequence length | 82754 | 82754 | 82754 | 82754 | 82754 |
| Total number of missing value in a diagram | User missing value | 0 | 0 | 0 | 0 | 0 |
| | System missing value | 0 | 0 | 0 | 0 | 0 |

FIG. 13

Case processing summary

| | | Calorific value prediction | Moisture prediction | Volatile content prediction | Ash content prediction | Sulfur content prediction |
|---|---|---|---|---|---|---|
| Normal distribution | Position | 20.6243 | 22.3991 | 35.9113 | 5.1574 | 0.4764 |
| | Scaling | 0.35480 | 0.48310 | 0.36019 | 0.42163 | 0.05259 |

FIG. 14

METHOD FOR PREDICTING COAL QUALITY OF COAL MILL BASED ON NEURAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to big data analysis and calculating coal quality in coal mills, in particular to a method for predicting coal quality in coal mills based on a neural network.

BACKGROUND OF THE INVENTION

Thermal coal power plants all use the method of blending coal for boiler combustion, as it is the most economic method. The coal type used in each coal mill may be different, and a single coal mill usually replaces the coal type every eight hours. This presents great difficulties for safely operating coal mill equipment and managing boiler combustion, mainly due to uncertainty about coal quality. When coal quality changes and the operating conditions are not adjusted in response, problems such as deflagration, over-temperature, boiler coking, and adjustment lag are likely to occur.

Online coal quality analyzers usually implement nuclear, laser, sub-infrared and other technologies for detection and analysis, each of which has its own advantages and disadvantages. Current coal quality analyzers offer only a small amount of data points, and they are greatly affected by factors such as environment and coal flow, such that the corresponding measurements have low accuracy. Some analyzers must be equipped with a neutron radioactive source, which poses a radioactive safety risk. Some analyzers are impractically bulky, inconvenient for on-site installation, and slow to generate results from the data detected. Most importantly, the cost of conventional online coal quality analyzers is prohibitively high: to detect the coal type in a coal mill in real time, one must install a measuring device on each coal feeder, which is a total cost of more than 1 million USD for every six units.

SUMMARY OF THE INVENTION

In view of the above problems, the present invention is proposed.

In accordance to one aspect of the present invention, a computer-implemented method for predicting coal quality of coal mill based on neural network is provided. The method includes: establishing a prediction model based on a neural network structure; importing cleaned coal mill data for model training; connecting the trained prediction model with a distributed control system (DCS) in real time; calculate online the running coal type of the coal mill; and determining the real-time running coal quality of the coal mill according to the calculation results.

In an embodiment of the method, the neural network structure includes a first layer, a second layer and a third layer, wherein the first layer includes an input layer, the second layer includes two hidden layers, the third layer includes an output layer.

In an embodiment of the method, the prediction model includes:

$$z_2 = XW_1$$

$$a_2 = \tan h(z_2)$$

$$z_3 = a_2 w_2$$

wherein X=input$\in R^{N \times D}$ (D is the total number of features, 27); $W_1$=the first layer's weight$\in R^{N \times H}$ (H is the total number of hidden units of the first layer, 54); $z_2$=the first layer's output$\in R^{N \times H}$; $a_2$=an output by an activation function of the first layer$\in R^{N \times H}$; $W_1$=the second layer's weight number$\in R^{N \times H}$ (H is the total number of hidden units of the second layer, 27); $z_3$=the second layer's output$\in R^{N \times H}$.

In an embodiment of the method, the prediction model further includes:

$$a_3 = \text{ReLU}(z_3)$$

$$z_4 = a_3 W_3$$

$$Y = \text{sigmoid}(z_4)$$

wherein $W_3$=the output layer's weight$\in R^{N \times C}$ (C is the total number of classified types); $a_3$=an output by an activation function of the second layer$\in R^{N \times H}$; $z_4$=the third layer's output$\in R^{N \times H}$; Y=a predict value$\in R^{N \times H}$ (N is the total number of samples).

In an embodiment of the method, each of the first layer, the second layer and the third layer has an activation function, wherein the activation function of the first layer includes a two-zone tangent function; the activation function of the second layer includes a ReLU function; and the activation function of the third layer includes a Sigmoid function.

In an embodiment of the method, the method further includes: real-time obtaining running parameters in the DCS by using the interface; importing running code of a programmed prediction model into a computer based on the programmed prediction model trained by Python language programming, wherein the computer is plugged into the DCS; communicating with the DCS through the interface, reading the prediction model to summarize required running parameters in real time; and writing back the currently calculated running coal quality of the coal mill of the coal mill in real time to the DCS.

In an embodiment of the method, the running parameters includes: a feedback of coal volume of coal feeder; an one-time air inlet temperature of the coal mill; an inlet air volume of the coal mill; an inlet air pressure of the coal mill; a first inlet air speed of the coal mill to a boiler first corner; a second inlet air speed the of coal mill to a boiler second corner; a third inlet air speed of the coal mill to a boiler third corner; a fourth inlet air speed of the coal mill to a boiler fourth corner; a differential pressure of a coal mill grinding bowl; a pipe temperature of a stone coal blanking pipe of the coal mill; and a coal mill current.

In an embodiment of the method, the running parameters further includes: a first wall temperature of a coal powder one-time air pipe of the coal mill; a second wall temperature of the coal powder one-time air pipe of the coal mill; a third wall temperature of the coal powder one-time air pipe of the coal mill; a fourth wall temperature of the coal powder one-time air pipe of the coal mill; a valve position of a coal mill heat one-time air adjustment baffle valve; a feedback speed of a rotary separator of the coal mill; a current of the rotary separator of the coal mill; an air powder temperature of an outlet of the coal mill; a first air powder pressure of the outlet of the coal mill; a second air powder pressure of the outlet of the coal mill; a further valve position of a cold one-time air adjustment baffle valve; a further differential pressure of a sealed air mill bowl; a total air volume; a total fuel volume; a generator active power; and a water temperature of a circulating water of a condenser inlet.

In an embodiment of the method, the running parameters are the coal mill data being analyzed, sorted and cleaned. The method further includes: manually determining, according to the type of added coal and the running parameters, the current running time of each type of coal, and sorting out 50 to 100 types of coal; outputting the running parameters according to the sorted time periods; performing a time scale alignment difference calculation; and marking a calorific value, a moisture, a volatile content, an ash content, and a sulfur content of each corresponding coal type.

Based on the foregoing embodiment, the method of the present invention utilizes a big data analysis neural network multi-layer structure to analyze and model a large number of coal type running parameters, so as to accurately understand the influence of each parameter on the coal type components (calorific value, moisture, volatile content, ash content, sulfur); accurately calculate the coal composition of the coal mill currently running without investing much hardware and software to transform equipment; and form a system that saves time and effort once installed. By the same token, when calculating the current coal composition running within the coal mill, mill operators can quickly change the control strategy according to the coal type change information, and thus prevent coal mill deflagration, boiler coking, excessive temperature, and exceeding environmental protection standards. As such, the coal milling unit's safety, economic and environmental performance will be greatly improved, which is the foundation of building a "smart power plant."

BRIEF DESCRIPTION OF THE DRAWINGS

Embodiments of the invention are described in more details hereinafter with reference to the drawings, in which:

FIG. 7 is a schematic diagram of case processing summary data of the method for predicting the coal quality of the coal mill based on the neural network according to an embodiment of the present invention;

FIG. 8 is a schematic diagram of the dependent variable being ash content in the model processing summary of the method for predicting the coal quality of the coal mill based on the neural network according to an embodiment of the present invention;

FIG. 9 is a schematic diagram of the dependent variable being volatile content in the model processing summary of the method for predicting the coal quality of the coal mill based on the neural network according to an embodiment of the present invention;

FIG. 10 is a schematic diagram of the dependent variable being calorific value in the model processing summary of the method for predicting the coal quality of the coal mill based on the neural network according to an embodiment of the present invention;

FIG. 11 is a schematic diagram of the dependent variable being moisture in the model processing summary of the method for predicting the coal quality of the coal mill based on the neural network according to an embodiment of the present invention;

FIG. 12 is a schematic diagram of model description data of the method for predicting coal quality of the coal mill based on the neural network according to an embodiment of the present invention;

FIG. 13 is a schematic diagram of another case processing summary data of the method for predicting coal quality of the coal mill based on the neural network according to an embodiment of the present invention;

FIG. 14 is a schematic diagram of the estimated distribution parameters of the method for predicting the coal quality of the coal mill based on the neural network according to an embodiment of the present invention;

DETAILED DESCRIPTION

In the following description, a method for predicting coal quality of the coal mill based on the neural network is set forth as a preferred example. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention will be described in detail with reference to the schematic diagrams. When describing the embodiments of the present invention in detail, for the convenience of explanation, the cross-sectional views showing the device structure will not be partially enlarged according to the general scale, and the schematic diagrams are only examples, which should not limit the present invention. scope of protection. In addition, the three-dimensional spatial dimensions of length, width and depth should be included in the actual production.

Meanwhile, in the description of the present invention, it should be noted that the orientation or positional relationship indicated in terms such as "upper, lower, inner and outer" is based on the orientation or positional relationship shown in the accompanying drawings, which is only for the convenience of describing the present invention. The invention and simplified description do not indicate or imply that the device or element referred to must have a particular orientation, be constructed and operate in a particular orientation, and therefore should not be construed as limiting the invention. Furthermore, the terms "first, second or third" are used for descriptive purposes only and should not be construed to indicate or imply relative importance.

Unless otherwise expressly specified and limited in the present invention, the terms "installation, connection, connection" should be understood in a broad sense. For example, it may be a fixed connection, a detachable connection or an integral connection; it may also be a mechanical connection, an electrical connection or a direct connection. The connection can also be indirectly connected through an intermediate medium, or it can be the internal communication between two elements. For those of ordinary skill in the art, the specific meanings of the above terms in the present invention can be understood in specific situations.

Figure 1A:
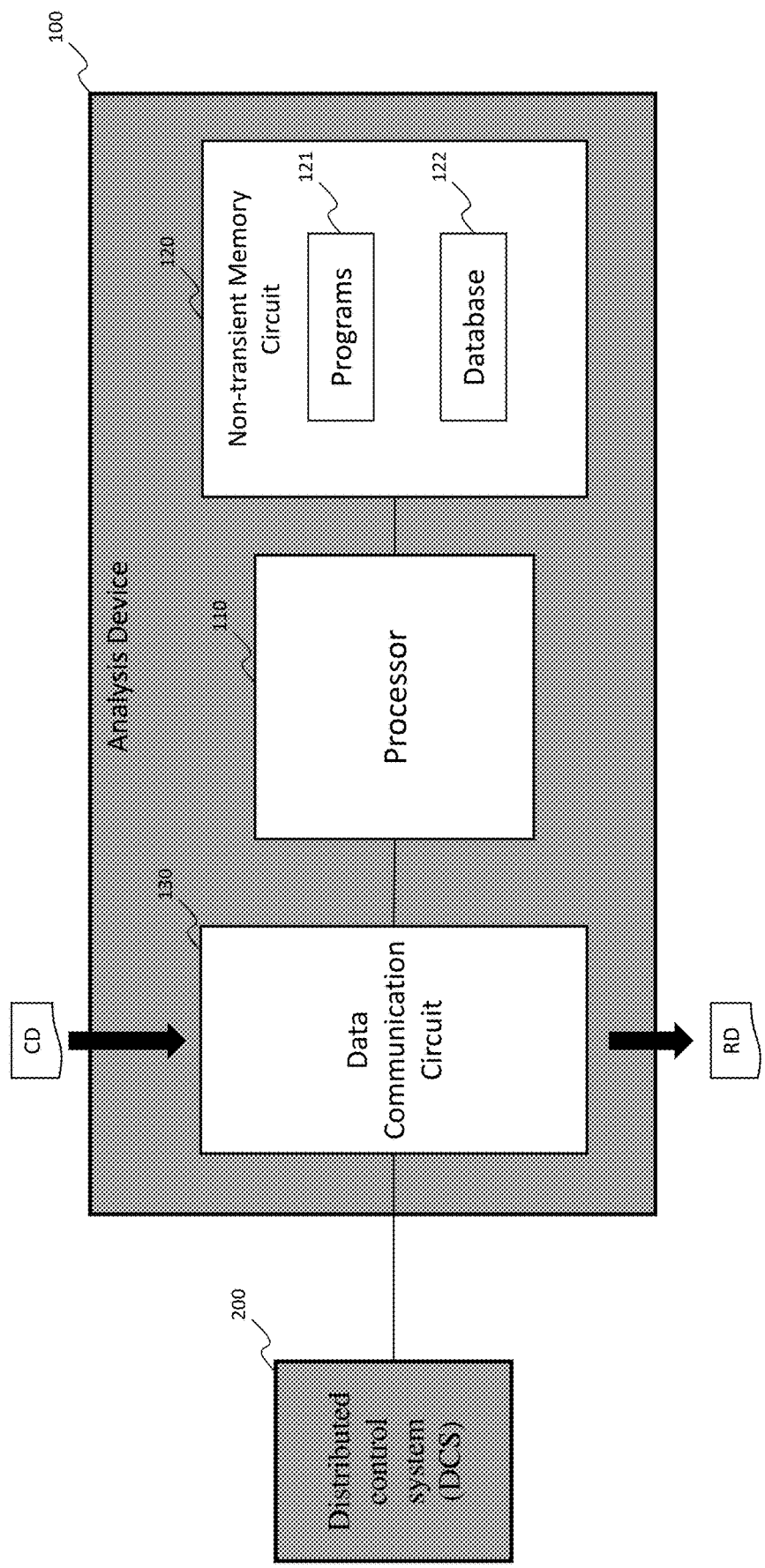
FIG. 1A is a block diagram of an analysis device according to an embodiment of the present invention.
Figure 1B:
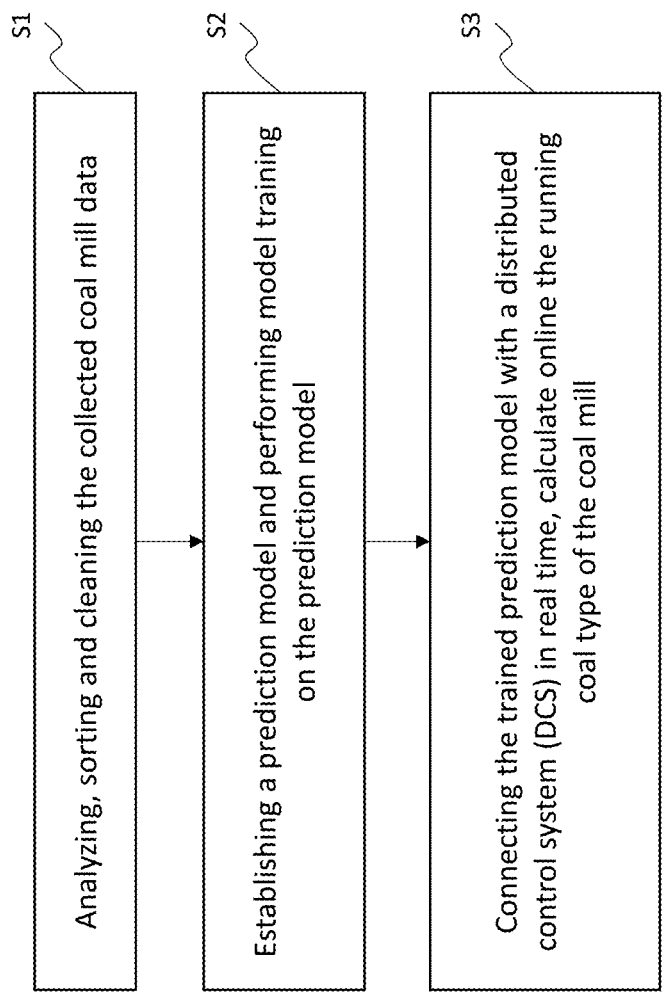
FIG. 1B is a schematic flowchart of a method for predicting coal quality of a coal mill based on a neural network according to an embodiment of the present invention.
Figure 2:
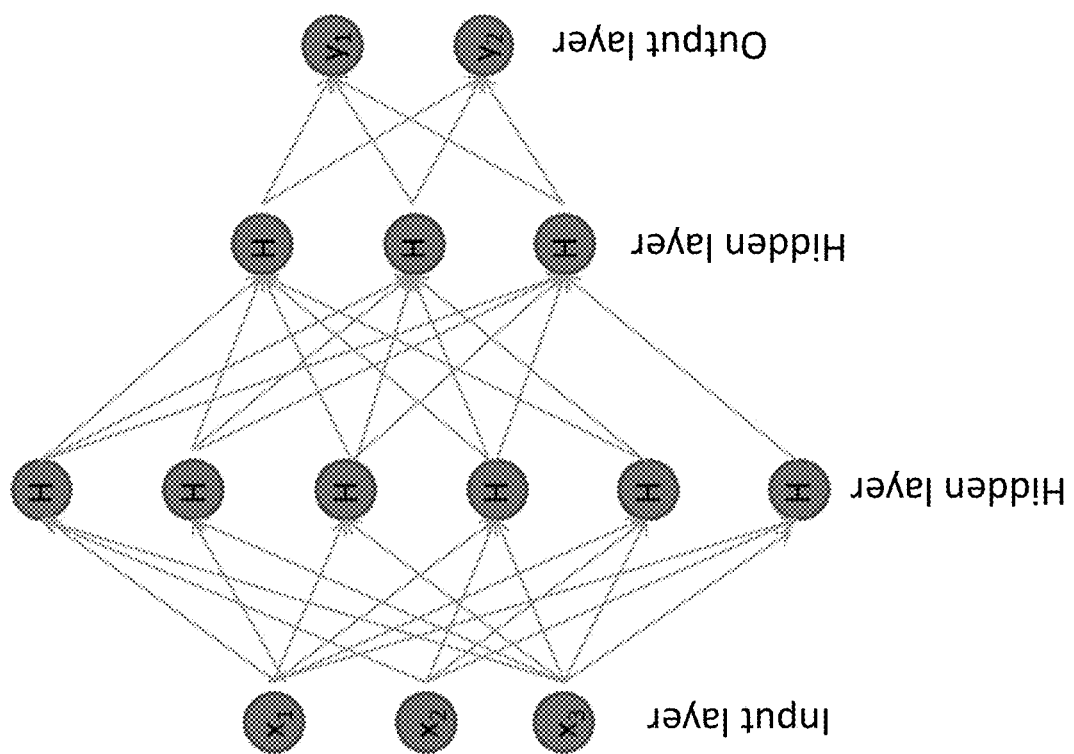
FIG. 2 is a schematic diagram of a network topology structure of the neural network multilayer perceptron of the method for predicting the coal quality of the coal mill based on a neural network according to an embodiment of the present invention.
Figure 3:
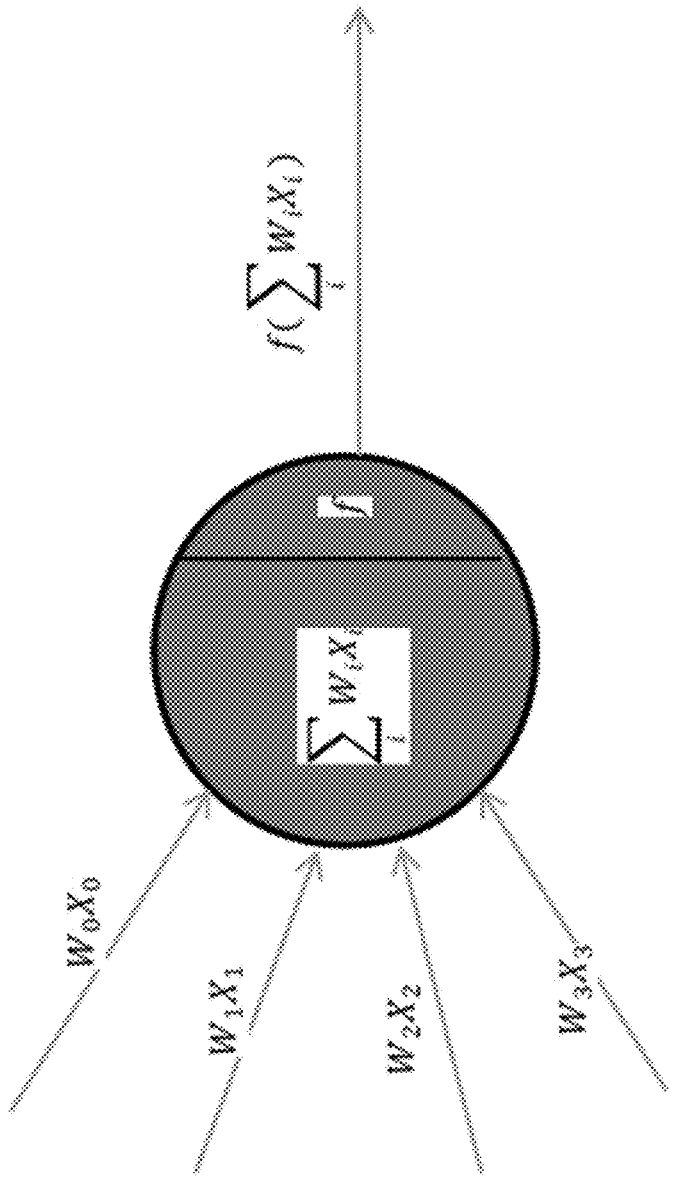
FIG. 3 is a schematic diagram of hidden layer nodes of the method for predicting the coal quality of the coal mill based on the neural network according to an embodiment of the present invention.
Figure 4:
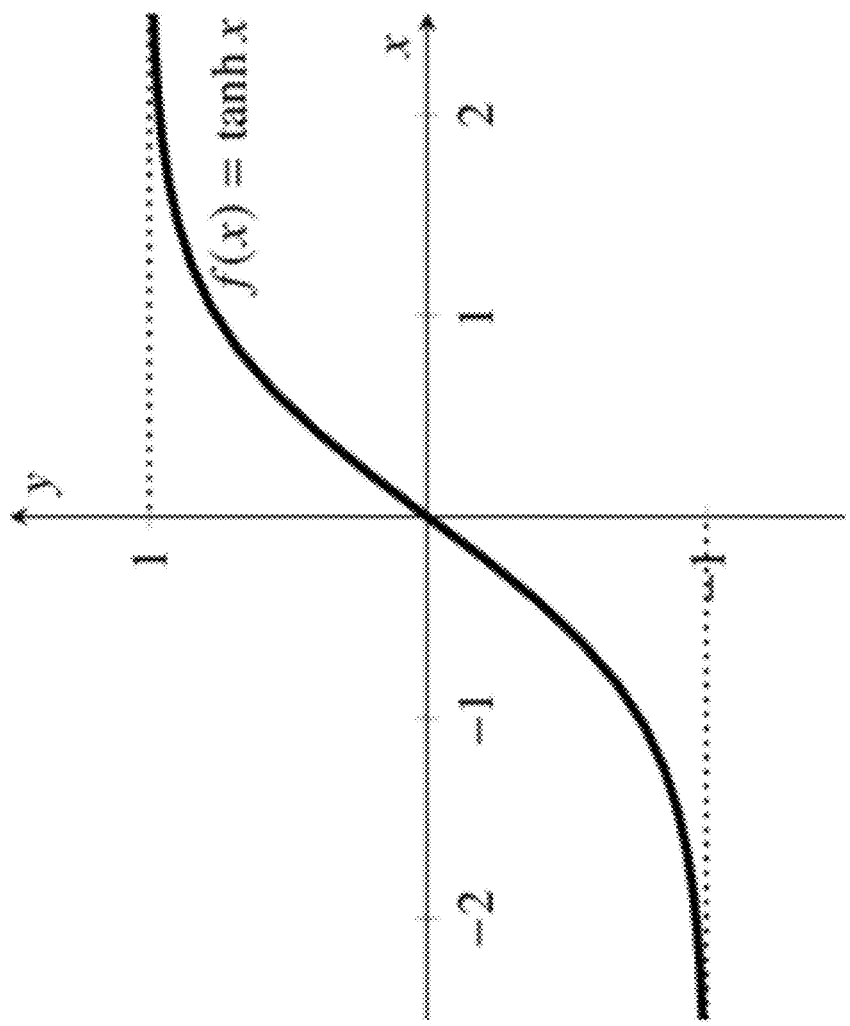
FIG. 4 is a schematic diagram of the double-zone tangent function of the method for predicting the coal quality of the coal mill based on the neural network according to an embodiment of the present invention.
Figure 5:
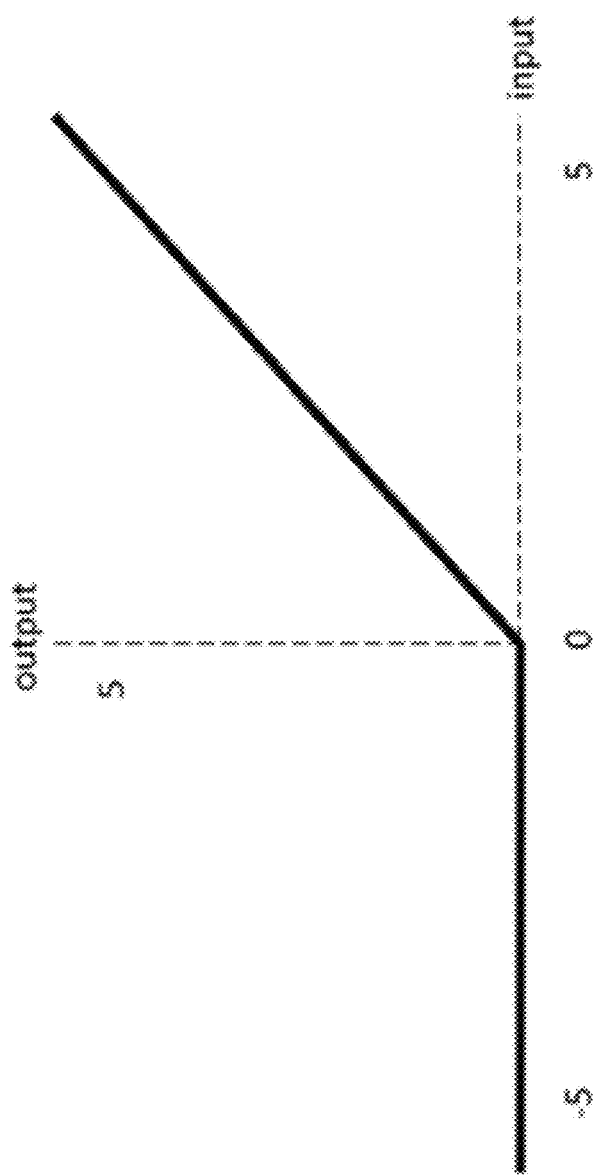
FIG. 5 is a schematic diagram of the ReLU function of the method for predicting the coal quality of the coal mill based on the neural network according to an embodiment of the present invention.
Figure 6:
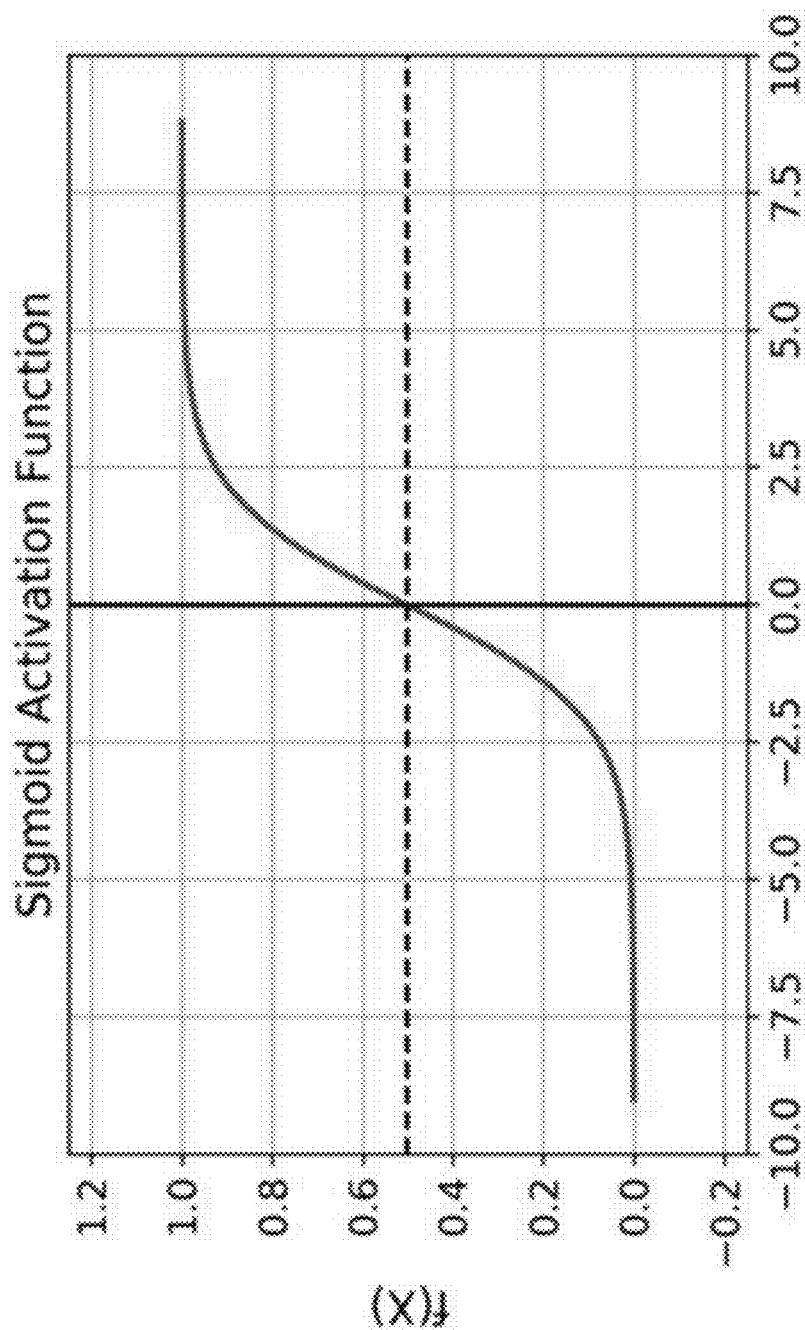
FIG. 6 is a schematic diagram of the Sigmoid function of the method for predicting the coal quality of the coal mill based on the neural network according to an embodiment of the present invention.
Figure 15:
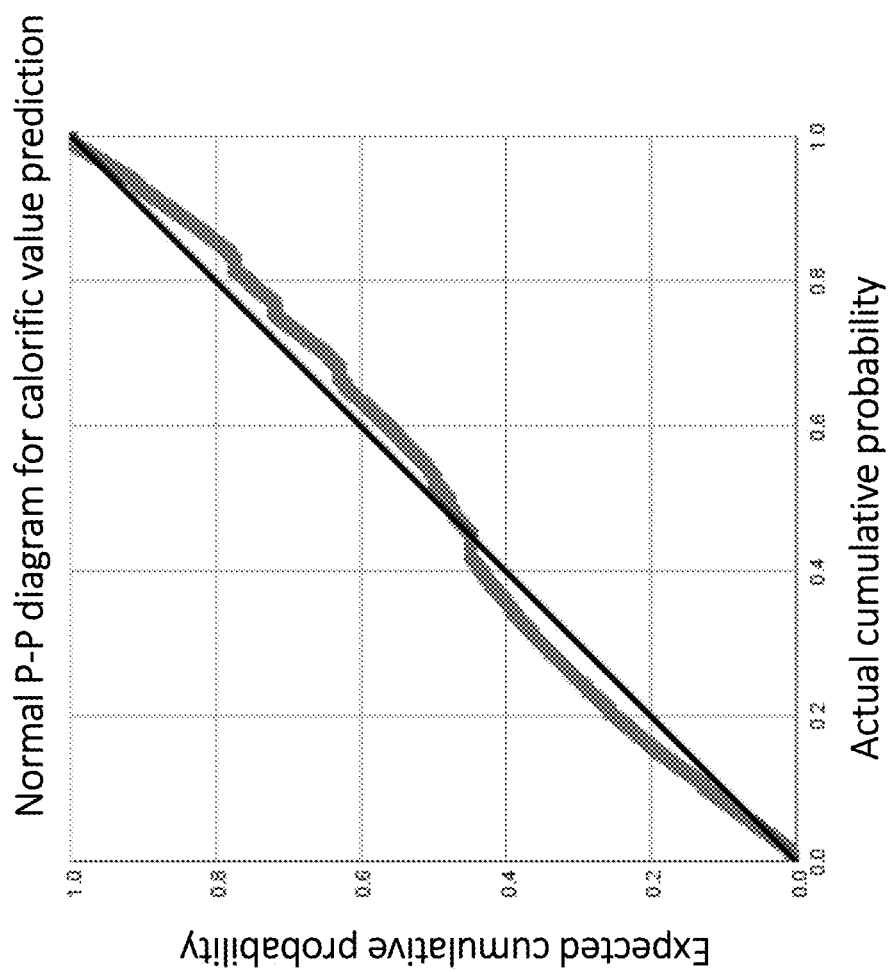
FIG. 15 is a schematic diagram of normal P-P for calorific value prediction of the method for predicting the coal quality of the coal mill based on the neural network according to an embodiment of the present invention.
Figure 16:
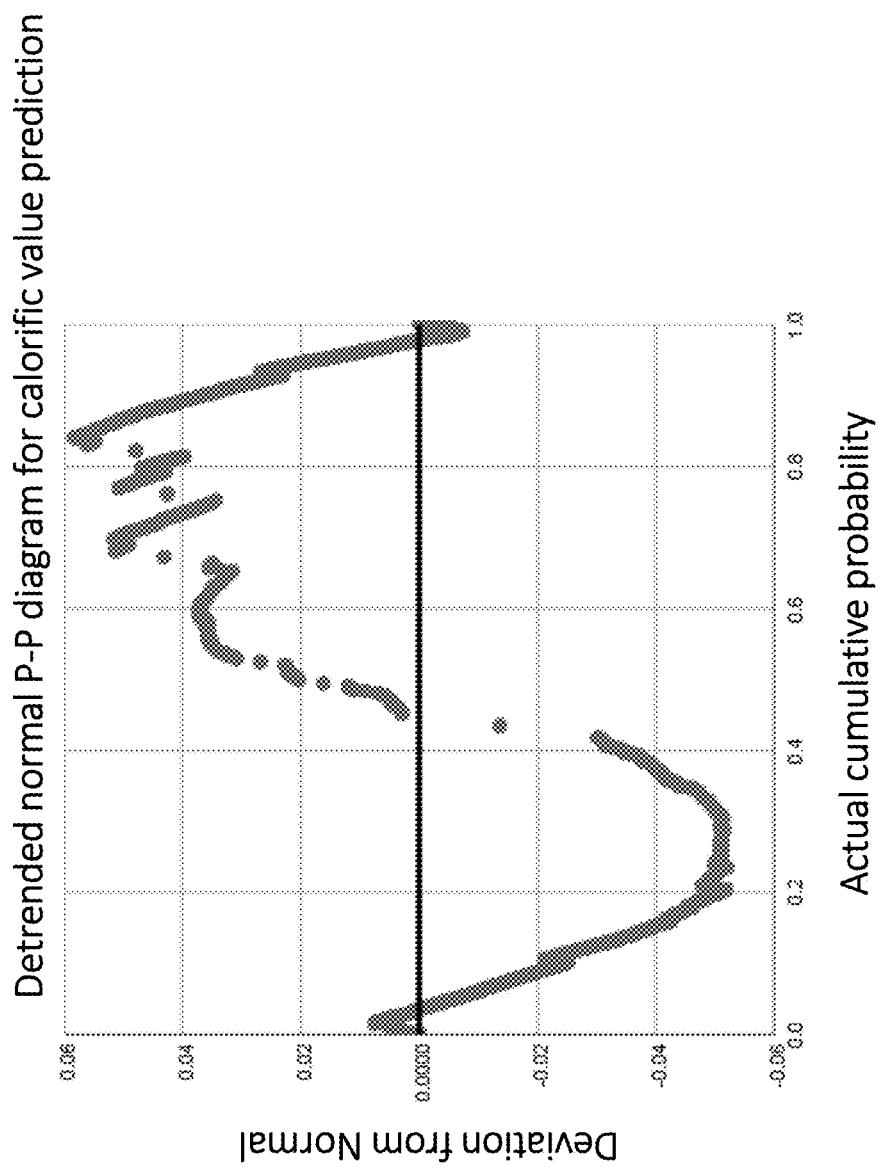
FIG. 16 is a schematic diagram of detrended normal P-P for calorific value prediction of the method for predicting the coal quality of the coal mill based on the neural network according to an embodiment of the present invention.
Figure 17:
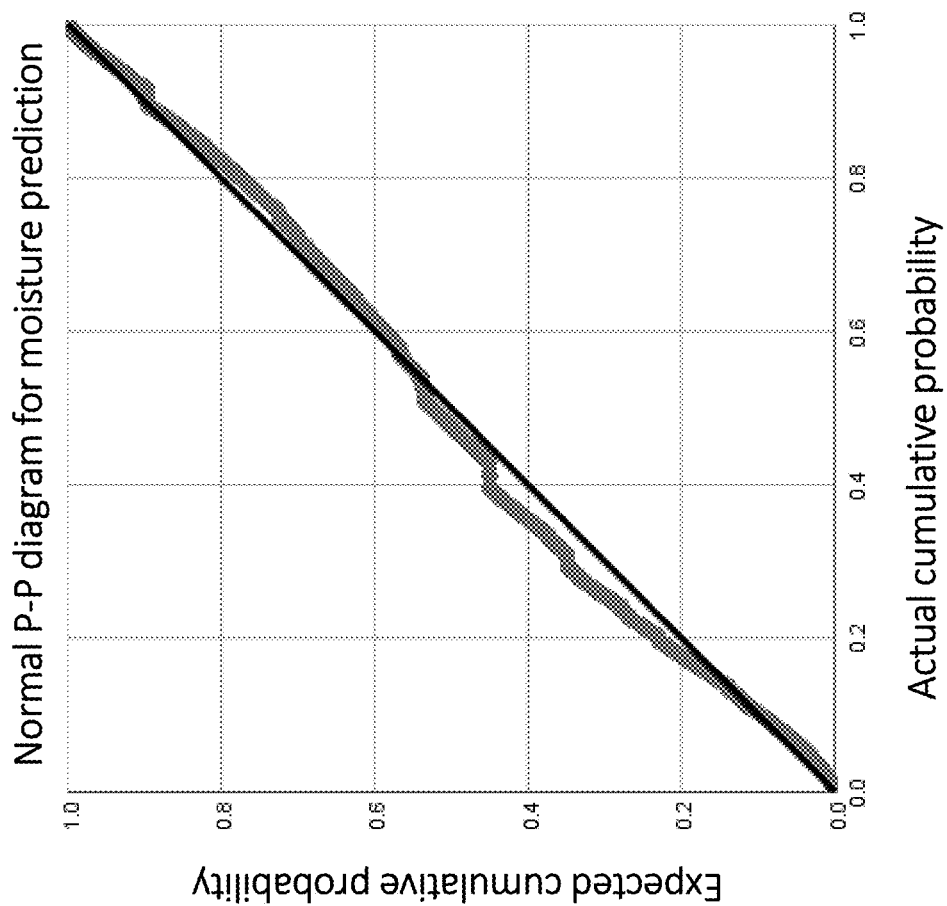
FIG. 17 is a schematic diagram of normal P-P for moisture prediction of the method for predicting the coal quality of the coal mill based on the neural network according to an embodiment of the present invention.
Figure 18:
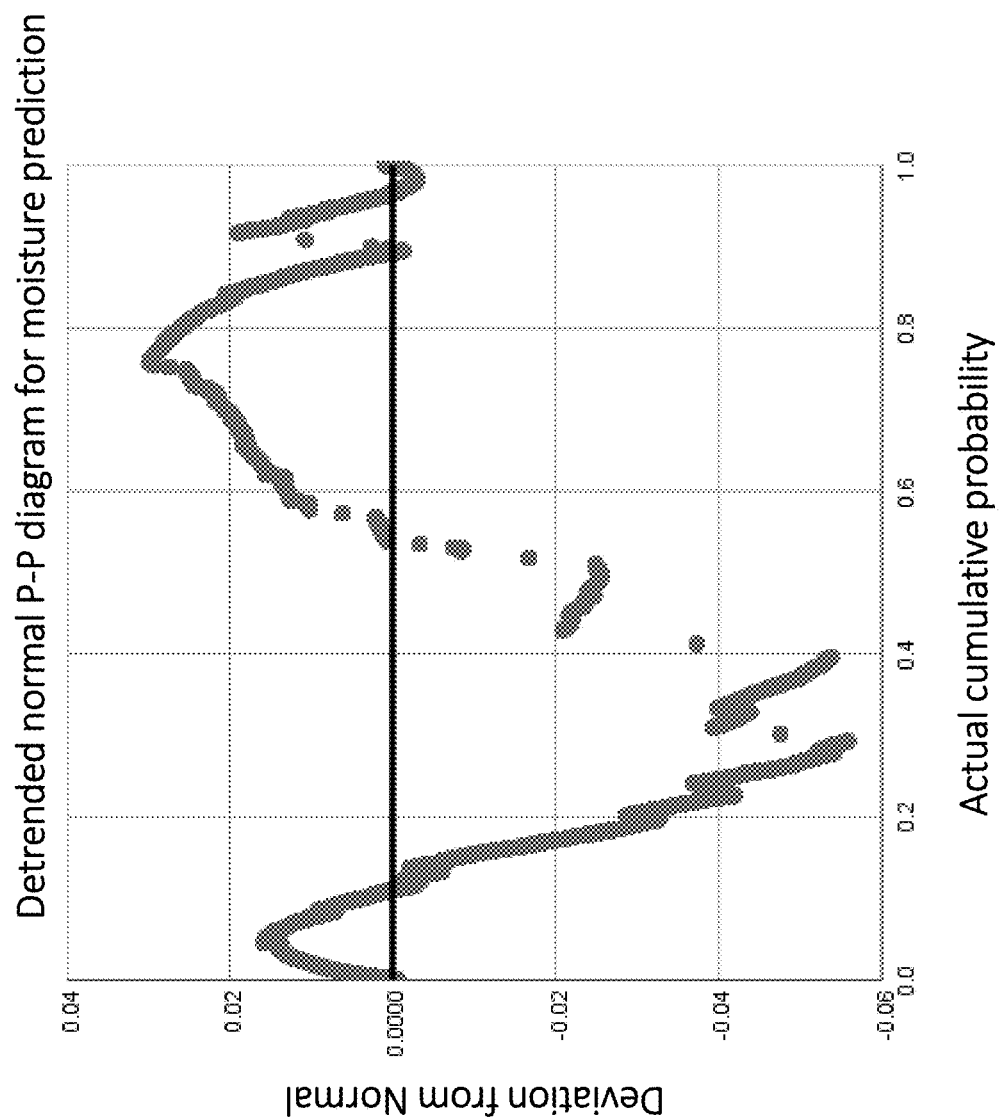
FIG. 18 is a schematic diagram of detrended normal P-P for moisture prediction of the method for predicting the coal quality of the coal mill based on the neural network according to an embodiment of the present invention.
Figure 19:
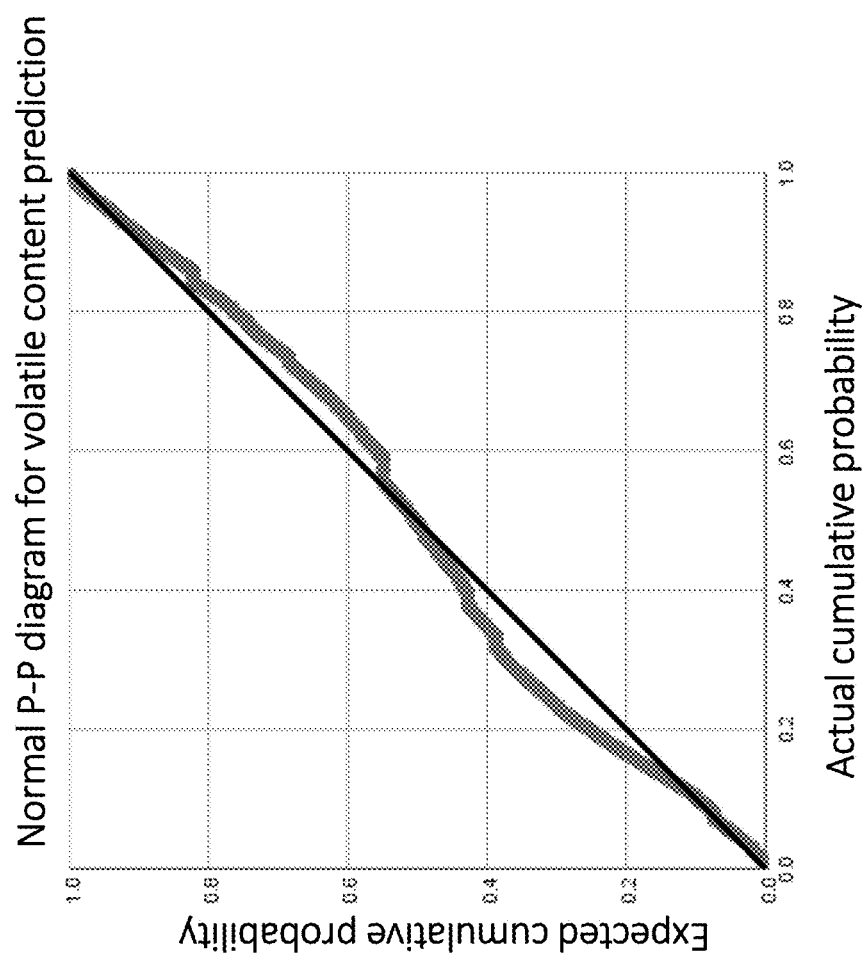
FIG. 19 is a schematic diagram of normal P-P for volatile content prediction of the method for predicting the coal quality of the coal mill based on the neural network according to an embodiment of the present invention.
Figure 20:
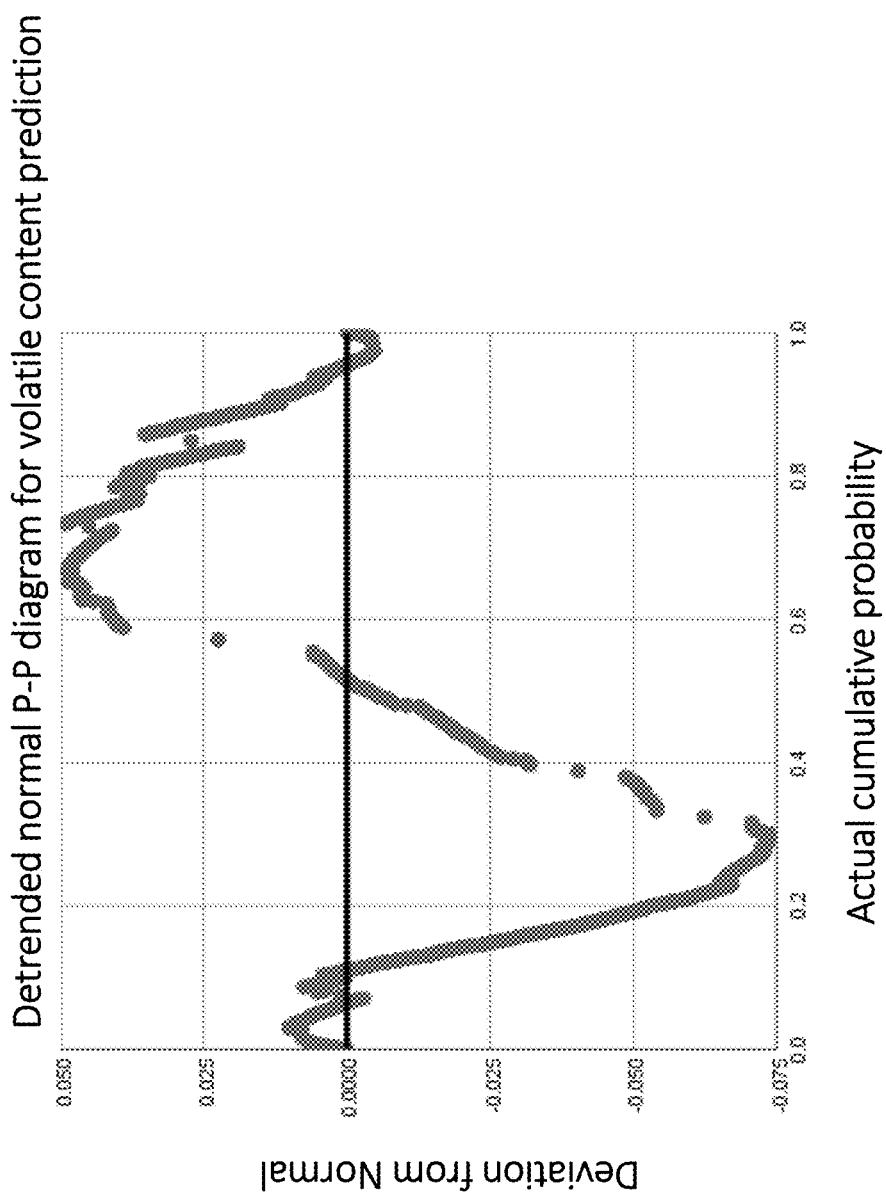
FIG. 20 is a schematic diagram of detrended normal P-P for volatile content prediction of the method for predicting the coal quality of the coal mill based on the neural network according to an embodiment of the present invention.
Figure 21:
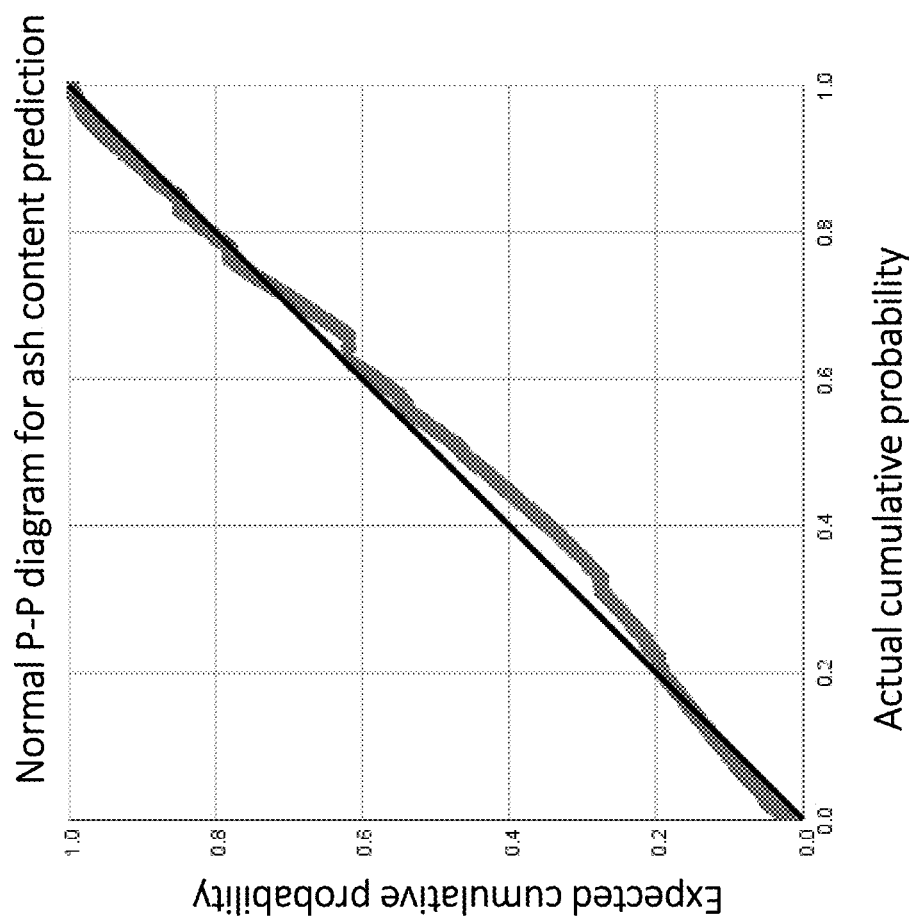
FIG. 21 is a schematic diagram of normal P-P for ash content prediction of the method for predicting the coal quality of the coal mill based on the neural network according to an embodiment of the present invention.
Figure 22:
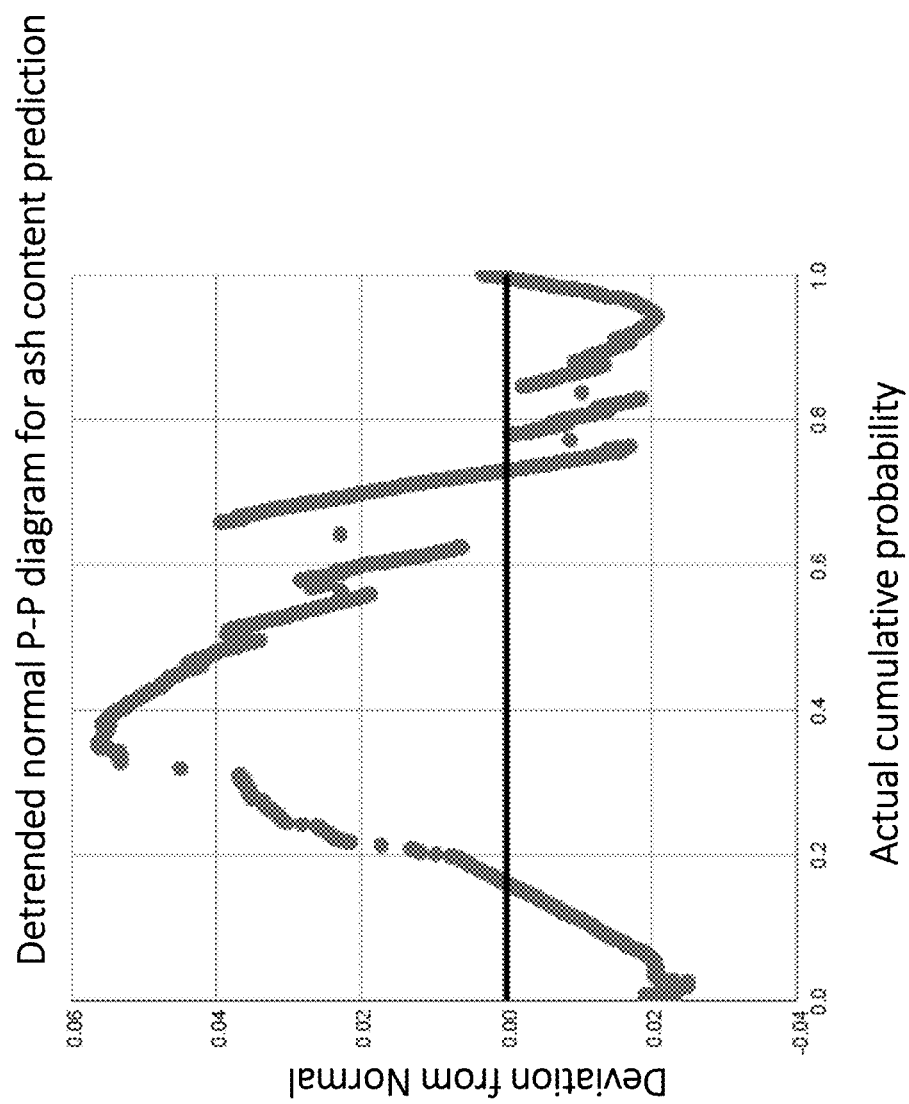
FIG. 22 is a schematic diagram of detrended normal P-P for ash content prediction of the method for predicting the coal quality of the coal mill based on the neural network according to an embodiment of the present invention.
Figure 23:
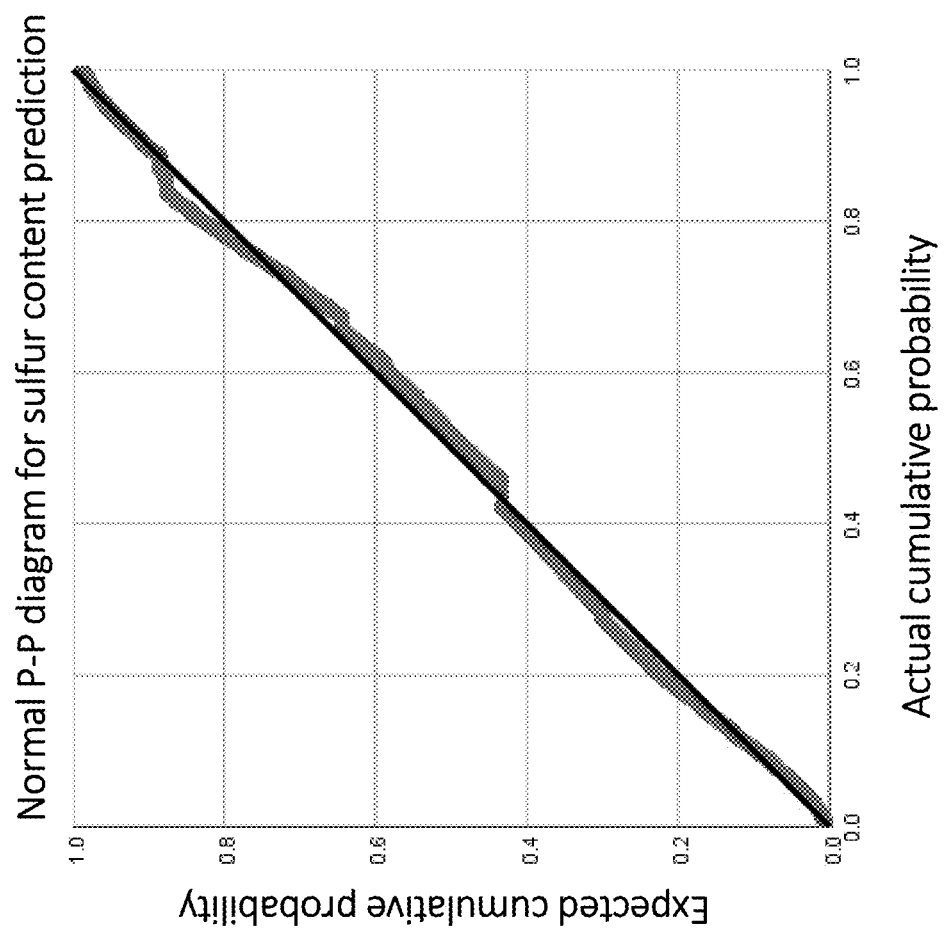
FIG. 23 is a schematic diagram of normal P-P for sulfur content prediction of the method for predicting the coal quality of the coal mill based on the neural network according to an embodiment of the present invention.
Figure 24:
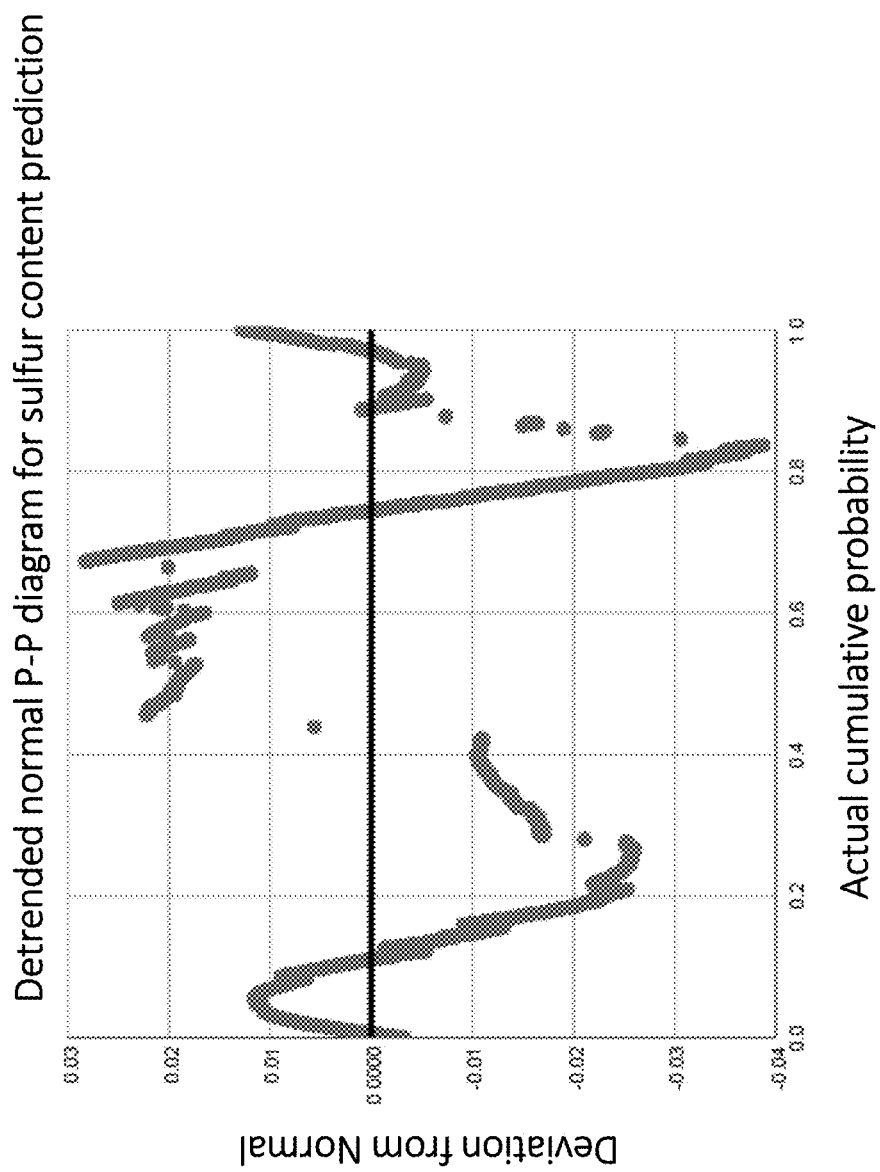
FIG. 24 is a schematic diagram of detrended normal P-P for sulfur content prediction of the method for predicting the coal quality of the coal mill based on the neural network according to an embodiment of the present invention.
Figure 25:
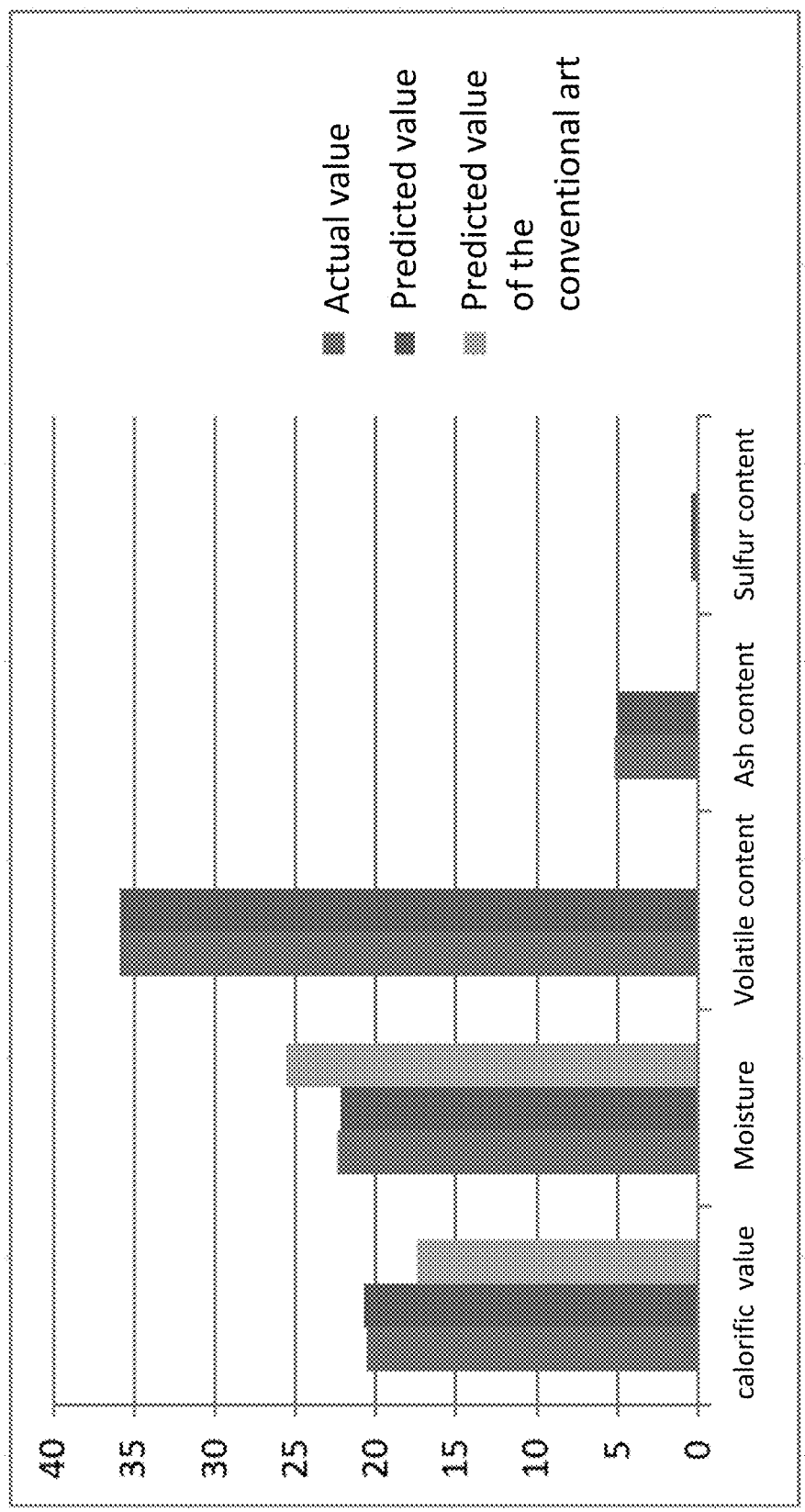
FIG. 25 is a schematic diagram showing the comparison of estimation and prediction of the method for predicting coal quality of the coal mill based on the neural network according to an embodiment of the present invention.

Referring to FIG. 1A in the following description, in accordance with various embodiments of the present invention, provided is an analysis device 100 that includes a processor 110, a non-transient memory circuit 120 and a data communication circuit 130.

The non-transient memory circuit 120 is configured to store programs 121 (machine instructions 121) and to host the database 122. The database 122 may be used to store collected data CD, prediction model(s), running parameters, data related to different coal types, and/or result data RD. The data communication circuit 130 is configured to establish the network connection(s) to a distributed control system (DCS) 200. The network connection(s) can be wired or wireless data communication connection(s). Furthermore, the data communication circuit 130 is configured to establish an additional network connection for receiving the collected data CD and sending the result data RD. The processor 110 executes the machine instructions 121 to implement methods provided by the presented disclosure. In an embodiment, the DCS can be built in the analysis device 100.

The DCS has a processor to execute further machine instructions to implement certain operations of the provided method.

Embodiment 1

Referring FIG. 1B to FIG. 6 for the embodiment 1 of the present invention, a computer-implemented method for predicting coal quality of a coal mill based on a neural network is provided. The method includes steps S1 to S3.

Step S1: Analyzing, sorting and cleaning the collected coal mill data according to the coal mill operation and boiler combustion mechanism. It should be mentioned that the running parameters are coal mill data after being analyzed, sorted and cleaned; manually determining, according to the type of added coal and the running parameters, the current running time of each type of coal, and sorting out 50 to 100 types of coal; outputting the running parameters according to the sorted time periods; performing a time scale alignment difference calculation; and marking the calorific value, moisture, volatile content, ash content, and sulfur content of each corresponding coal type.

Specifically, the running parameters includes: a feedback of coal volume of coal feeder; an one-time air inlet temperature of the coal mill; an inlet air volume of the coal mill; an inlet air pressure of the coal mill; a first inlet air speed of the coal mill to a boiler first corner; a second inlet air speed the of coal mill to a boiler second corner; a third inlet air speed of the coal mill to a boiler third corner; a fourth inlet air speed of the coal mill to a boiler fourth corner; a differential pressure of a coal mill grinding bowl; a pipe temperature of a stone coal blanking pipe of the coal mill; and a coal mill current.

The running parameters further includes: a first wall temperature of a coal powder one-time air pipe of the coal mill; a second wall temperature of the coal powder one-time air pipe of the coal mill; a third wall temperature of the coal powder one-time air pipe of the coal mill; a fourth wall temperature of the coal powder one-time air pipe of the coal mill; a valve position of a coal mill heat one-time air adjustment baffle valve; a feedback speed of a rotary separator of the coal mill; a current of the rotary separator of the coal mill; an air powder temperature of an outlet of the coal mill; a first air powder pressure of the outlet of the coal mill; a second air powder pressure of the outlet of the coal mill; a further valve position of a cold one-time air adjustment baffle valve; a further differential pressure of a sealed air mill bowl; a total air volume; a total fuel volume; a generator active power; and a water temperature of a circulating water of a condenser inlet.

Step S2: Establishing a prediction model based on a neural network multilayer perceptron (e.g., neural network structure), and the cleaned coal mill data is imported for model training.

More specifically, the neural network structure comprises a first layer, a second layer and a third layer. The first layer comprises an input layer, the second layer comprises two hidden layers, and the third layer comprises an output layer.

Furthermore, the first layer, the second layer and the third layer each have an activation function.

The activation function of the first layer comprises a two-zone tangent function.

$$f(x) = \tanh(x) = \frac{1 - e^{-2x}}{1 + e^{-2x}}$$

The activation function of the second layer comprises a ReLU function.

$$f(x) = \begin{cases} x, & x \geq 0 \\ 0, & x < 0 \end{cases}$$

The activation function of the third layer comprises a Sigmoid function.

$$f(x) = \frac{1}{1 + e^{-x}}$$

The prediction model includes:

$z_2 = XW_1$ $a_2 = \tan h(z_2)$ $z_3 = a_2 w_2$ $a_3 = \text{ReLU}(z_3)$ $z_4 = a_3 W_3$ $Y = \text{sigmoid}(z_4)$ wherein X=input∈ $R^{N \times D}$ (D is the total number of features, 27); $W_1$=the first layer's weight∈ $R^{N \times H}$ (H is the total number of hidden units of the first layer, 54); $z_2$=the first layer's output∈ $R^{N \times H}$; $a_2$=an output by an activation function of the first layer∈ $R^{N \times H}$; $w_2$=the second layer's weight number∈ $R^{N \times H}$ (H is the total number of hidden units of the second layer, 27); $z_3$=the second layer's output∈ $R^{N \times H}$; $W_3$=the output layer's weight∈ $R^{N \times C}$ (C is the total number of classified types); $a_3$=an output by an activation function of the second layer∈ $R^{N \times H}$; $z_4$=the third layer's output∈ $R^{N \times H}$; and Y=a predict value∈ $R^{N \times H}$ (N is the total number of samples).

Step S3: Connecting the trained prediction model with a distributed control system (DCS) in real time, calculate online the running coal type of the coal mill; and determining the real-time running coal quality of the coal mill according to the calculation results.

Specifically, real-time obtaining running parameters in the DCS by using the interface; importing running code of a programmed prediction model into a computer based on the programmed prediction model trained by Python language programming, wherein the computer is plugged into the DCS; communicating with the DCS through the interface, reading the prediction model to summarize required running parameters in real time; and writing back the currently calculated running coal quality of the coal mill of the coal mill in real time to the DCS, such that the calculated running coal quality can be used to display to warn and to control.

The method of the present invention utilizes a big data analysis neural network multi-layer structure to analyze and model a large number of coal type running parameters, so as to accurately understand the influence of each parameter on the coal type components (calorific value, moisture, volatile content, ash content, sulfur); accurately calculate the coal composition of the coal mill currently running without investing much hardware and software to transform equipment; and form a system that saves time and effort once installed.

Embodiment 2

Referring to FIG. 7 to FIG. 25 for the embodiment 2 of the present invention: the difference between embodiment 1 and embodiment 2 is that the latter provides a prediction accuracy verification for a coal mill coal quality prediction method based on a neural network (i.e., the method of embodiment 1).

To better verify and explain the technical effect adopted in the method of the present invention, in this embodiment the traditional mechanism model prediction technology and the method of the present invention are selected to be compared and tested, and the test results are compared by means of scientific demonstration to verify the actual effect of the provided method of the present invention.

Traditional mechanism model prediction technology cannot calculate the coal type of the coal mill in real time online, and the determined coal type data has errors. To verify that the provided method of the present invention has higher prediction accuracy and a lower cost than the traditional method, in this embodiment the traditional method and the provided method of the present invention will be used to predict and compare the coal quality of a coal mill in a simulation platform.

Test environment: (1) Set the prediction parameters, including calorific value, moisture, volatile content, ash content and sulfur content; (2) Define the length of the non-seasonal period, use Bloom's algorithm for fractional rank estimation, and the rank assigned to the bound value is the average rank; (3) Obtain the sequence lengths of calorific value prediction, moisture prediction, volatile content prediction, ash content prediction and sulfur content prediction, and estimate the distribution parameters for their positions and scales under the normal distribution; (4) Observe, record and output, via automatic testing equipment, the normal P-P and detrended normal P-P curves of calorific value prediction, moisture prediction, volatile content prediction, ash content prediction and sulfur content prediction through debugging simulation experiments; (5) Track and record, via the automatic test equipment, the comparison data of the output real value, the predicted value of the provided method of the present invention and the predicted value of the mechanism model under the traditional method.

Referring to FIG. 15 to FIG. 25, one can understand that the technical effect of the provided method of the present invention is robust; that is, the authenticity of the present invention's method is verified.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for predicting coal quality of coal mill based on neural network, comprising:
   establishing a prediction model based on a neural network structure;
   importing cleaned coal mill data to train the prediction model, thereby obtaining a trained prediction model;
   connecting the trained prediction model with a distributed control system (DCS) in real time;
   calculate online the running coal type of the coal mill; and
   determining the real-time running coal quality of the coal mill according to the calculation results;
   wherein the neural network structure comprises a first layer, a second layer and a third layer,
   wherein the first layer comprises an input layer;
   wherein the second layer comprises two hidden layers;
   wherein the third layer comprises an output layer;
   wherein the prediction model comprises:

$$z_2 = XW_1$$

$$a_2 = \tan h(z_2)$$

$$z_3 = a_2 w_2$$

wherein $X = \text{input} | \in R^{N \times D}$ (D is the total number of features, 27);
   $W_1$ = the first layer's weight $| \in R^{N \times H}$ (H is the total number of hidden units of the first layer, 54);
   $z_2$ = the first layer's output $| \in R^{N \times H}$;
   $a_2$ = an output by an activation function of the first layer $| \in R^{N \times H}$;
   $w_2$ = the second layer's weight number $| \in R^{N \times H}$ (H is the total number of hidden units of the second layer, 27); and
   $z_3$ = the second layer's output $| \in R^{N \times H}$;
   wherein the prediction model further comprises:

$$a_3 = \text{ReLU}(z_3)$$

$$z_4 = a_3 W_3$$

$$Y = \text{sigmoid}(z_4)$$

wherein
   $W_3$ = the output layer's weight $| \in R^{N \times C}$ (C is the total number of classified types);
   $a_3$ = an output by an activation function of the second layer $| \in R^{N \times H}$;
   $z_4$ = the third layer's output $| \in R^{N \times H}$; and
   $Y$ = a predict value $| \in R^{N \times H}$ (N is the total number of samples);
   wherein each of the first layer, the second layer and the third layer has an activation function;
   wherein the activation function of the first layer comprises a two-zone tangent function;
   wherein the activation function of the second layer comprises a ReLU function;
   wherein the activation function of the third layer comprises a Sigmoid function;
   wherein the computer-implement method further comprises:
   real-time obtaining running parameters in the DCS by using the interface;
   importing running code of a programmed prediction model into a computer based on the programmed prediction model trained by Python language programming, wherein the computer is plugged into the DCS;
   communicating with the DCS through the interface, reading the prediction model to summarize required running parameters in real time; and
   writing back the currently calculated running coal quality of the coal mill of the coal mill in real time to the DCS;
   wherein the running parameters comprises:
   a feedback of coal volume of coal feeder;
   an one-time air inlet temperature of the coal mill;
   an inlet air volume of the coal mill;
   an inlet air pressure of the coal mill;
   a first inlet air speed of the coal mill to a boiler first corner;
   a second inlet air speed the of coal mill to a boiler second corner;
   a third inlet air speed of the coal mill to a boiler third corner;
   a fourth inlet air speed of the coal mill to a boiler fourth corner;
   a differential pressure of a coal mill grinding bowl;

a pipe temperature of a stone coal blanking pipe of the coal mill; and a coal mill current.

2. The computer-implement method of claim 1, the running parameters further comprises:

a first wall temperature of a coal powder one-time air pipe of the coal mill;

a second wall temperature of the coal powder one-time air pipe of the coal mill;

a third wall temperature of the coal powder one-time air pipe of the coal mill;

a fourth wall temperature of the coal powder one-time air pipe of the coal mill;

a valve position of a coal mill heat one-time air adjustment baffle valve;

a feedback speed of a rotary separator of the coal mill;

a current of the rotary separator of the coal mill;

an air powder temperature of an outlet of the coal mill;

a first air powder pressure of the outlet of the coal mill;

a second air powder pressure of the outlet of the coal mill;

a further valve position of a cold one-time air adjustment baffle valve;

a further differential pressure of a sealed air mill bowl;

a total air volume;

a total fuel volume;

a generator active power; and a water temperature of a circulating water of a condenser inlet.

3. The computer-implement method of claim 2, the running parameters are the coal mill data after being analyzed, sorted and cleaned, and the method further comprises:

manually determining, according to the type of added coal and the running parameters, the current running time of each type of coal, and sorting out 50 to 100 types of coal;

outputting the running parameters according to the sorted time periods;

performing a time scale alignment difference calculation; and marking a calorific value, a moisture, a volatile content, an ash content, and a sulfur content of each corresponding coal type.

* * * * *